US009960905B2

(12) United States Patent
Yasuda (10) Patent No.: US 9,960,905 B2
(45) Date of Patent: May 1, 2018

(54) CRYPTOGRAPHIC PROCESSING DEVICE AND CRYPTOGRAPHIC PROCESSING METHOD

(71) Applicant: FUJITSU LIMITED, Kawasaki-shi, Kanagawa (JP)

(72) Inventor: Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 15/058,677

(22) Filed: Mar. 2, 2016

(65) Prior Publication Data

US 2016/0269174 A1    Sep. 15, 2016

(30) Foreign Application Priority Data

Mar. 10, 2015 (JP) .................. 2015-047742

(51) Int. Cl.
*H04K 1/00* (2006.01)
*H04L 9/00* (2006.01)
(Continued)

(52) U.S. Cl.
CPC .............. *H04L 9/008* (2013.01); *H04L 9/14* (2013.01); *H04L 9/3231* (2013.01); *H04L 2209/24* (2013.01)

(58) Field of Classification Search
CPC ....... H04L 9/008; H04L 9/14; H04L 2209/24; H04L 9/3026; H04L 9/3093;
(Continued)

(56) References Cited

U.S. PATENT DOCUMENTS

2012/0207299 A1    8/2012 Hattori et al.
2014/0185794 A1    7/2014 Yasuda et al.

FOREIGN PATENT DOCUMENTS

EP          3032775 A1    6/2016
JP       2014-126865      7/2014
(Continued)

OTHER PUBLICATIONS

Masaya Yasuda et al: "Secure pattern matching using somewhat homomorphic encryption",Cloud Computing Security Workshop, ACM, 2 Penn Plaza, Suite 701 New York NY 10121-0701 USA, Nov. 8, 2013 (Nov. 8, 2013), pp. 65-76, XP058034246, DOI: 10.1145/2517488.2517497 ISBN: 978-1-4503-2490-8.*

(Continued)

*Primary Examiner* — Abiy Getachew
(74) *Attorney, Agent, or Firm* — Fujitsu Patent Center (57) ABSTRACT

A cryptographic processing device includes a processor that generates a first encrypted polynomial, a receiver that receives cryptographic information representing a fourth encrypted polynomial, and cryptographic information representing a second random number, the fourth encrypted polynomial including a first operation result that is a result of an operation of a fifth vector and a sixth vector, the first operation result being obtained by a second encrypted polynomial and a third encrypted polynomial, wherein the second encrypted polynomial is obtained based on the first encrypted polynomial, the second random number, and a second polynomial that corresponds to a third vector obtained by adding zero to the second vector, and the third encrypted polynomial is obtained based on the fifth vector obtained by adding zero to a fourth vector. The processor generates a second operation result that is a result of an operation of the second vector and the fourth vector.

9 Claims, 4 Drawing Sheets

(51) Int. Cl.
*H04L 9/14* (2006.01)
*H04L 9/32* (2006.01)

(58) Field of Classification Search
CPC .......... H04L 2209/125; H04L 2209/20; H04L 2209/30; H04L 9/0631; H04L 9/0662; H04L 9/0838; H04L 9/3013; H04L 9/3033; H04L 9/3066; H04L 9/3231; G09C 1/00
See application file for complete search history.

(56) References Cited

FOREIGN PATENT DOCUMENTS

| | | | |
|---|---|---|---|
| JP | EP 3032775 A1 * | 6/2016 | ............. H04L 9/008 |
| WO | 2011/052056 | 5/2011 | |

OTHER PUBLICATIONS

Extended European Search Report dated Aug. 2, 2016 for corresponding European Patent Application No. 16158229.1, 11 pages.
Yasuda, Masaya et al., "Secure Pattern Matching using Somewhat Homomorphic Encryption", Cloud Computing Security Workshop, ACM, Nov. 8, 2013, pp. 65-76, XP058034246.
Kipnis, Aviad et al., "Efficient Methods for Practical Fully-Homomorphic Symmetric-key Encrypton, Randomization, and Verification", International Association for Cryptologic Research, vol. 20121111:161947, Nov. 8, 2012, pp. 1-20, XP061006941.
Yasuda, Masaya et al., "Practical Packing Method in Somewhat Homomorphic Encryption", Lecture Notes in Computer Science 8247, pp. 34-50, Mar. 21, 2014, XP047269045.
Yasuda, Masaya et al., "Practical Packing Method in Somewhat Homomorphic Encryption", The 8-th International Workshop on Data Privacy Management (DPM 2013), Sep. 13, 2013, 12 pages, Retrieved from the Internet: URL:http://research.icbnet.ntua.gr/DPM2013/resources/slides/05.pdf, [retrieved on Jun. 29, 2015], XP055198848.
Yasuda, Masaya et al., "Packed Homomorphic Encryption Based on Ideal Lattices and Its Application to Biometrics", Security Engineering and Intelligence Informatics, vol. 8128 of the series Lecture Notes in Computer Science, pp. 55-74, Sep. 2, 2013, XP047037853.
European Brief Communication dated Oct. 26, 2016 for corresponding European Patent Application No. 16158229.1, 1 page.
European Search Report dated Nov. 18, 2016 for corresponding European Patent Application No. 16158229.1, 12 pages.
Craig Gentry et al., "Fully Homomorphic Encryption Using Ideal Lattices", STOC 2009, pp. 169-178, May 31-Jun. 2, 2009 (10 pages).
Kristin Lauter et al., "Can Homomorphic Encryption be Practical?", In ACM workshop on Cloud Computing Security Workshop—CCSW 2011, ACM, pp. 113-124, Oct. 21, 2011 (12 pages).

* cited by examiner

F I G. 4

CRYPTOGRAPHIC PROCESSING DEVICE AND CRYPTOGRAPHIC PROCESSING METHOD

CROSS-REFERENCE TO RELATED APPLICATION

This application is based upon and claims the benefit of priority of the prior Japanese Patent Application No. 2015-047742, filed on Mar. 10, 2015, the entire contents of which are incorporated herein by reference.

FIELD

The embodiments discussed herein are related to a cryptographic processing device and a cryptographic processing method.

BACKGROUND

While regulations to protect personal information and confidential information have recently been tightened, the market of the services that use on such information has been expanding. A service that uses the information on the positions of personal users that can be obtained from their smartphones is an example of such a service.

Thus, securing technologies that permit using of personal information or confidential information that remains protected have been attracting attention. Among the securing technologies, there is a method that uses a cryptographic technology or a statistical technology according to a data type or service requirements.

A homomorphic encryption technology is known as a securing technology that uses a cryptographic technology. The homomorphic encryption technology is one of the public key encryption methods in which a pair of different keys is used for encryption and decryption, and has a function that permits a data operation in a state in which the data remains encrypted. For example, an encryption function E of a homomorphic encryption with respect to addition and multiplication has the characteristics as described in the following formulas for a plain text m1 and a plain text m2:

$$E(m1)+E(m2)=E(m1+m2) \quad (1)$$

$$E(m1)*E(m2)=E(m1*m2) \quad (2)$$

Formula (1) indicates that it is homomorphic for addition, and Formula (2) indicates that it is homomorphic for multiplication. As described above, according to the homomorphic encryption technology, when performing, on two or more encrypted texts, an operation that corresponds to an addition or multiplication, an encrypted text that is a result of an operation of adding or multiplying the original plain texts can be obtained without decrypting the encrypted texts.

Such characteristics of a homomorphic encryption have been expected to be used in the field of e-voting or e-money, or in the field of cloud computing, in recent years. As a homomorphic encryption with respect to addition or multiplication, the Rivest Shamir Adleman (RSA) encryption that only permits multiplication to be performed and the Additive ElGamal encryption that only permits addition to be performed are known.

Further, a homomorphic encryption that satisfies Formulas (1) and (2) was proposed in 2009 that permits both addition and multiplication to be performed (see, for example, Non Patent Document 1). Non Patent Document 1 only discloses a theoretical method for realizing a homomorphic encryption, and does not disclose a practical constructing method. However, in recent years, a practical constructing method of a somewhat homomorphic encryption has been proposed that permits both addition and multiplication to be performed (see, for example, Non Patent Document 2).

For a secured distance calculation using a homomorphic encryption, a cryptographic processing device that permits a reduction in both a size of encrypted vector data and a time for the secured distance calculation is also known (see, for example, Patent Document 1). This cryptographic processing device obtains a first polynomial from a first vector by use of a first transform polynomial and a second polynomial from a second vector by use of a second transform polynomial. Then, the cryptographic processing device obtains a first weight that relates to a secured distance of the first vector and a second weight that relates to a secured distance of the second vector.

Next, the cryptographic processing device encrypts each of the first polynomial, the second polynomial, the first weight, and the second weight using a homomorphic encryption, so as to obtain a first encrypted polynomial, a second encrypted polynomial, a first encrypted weight, and a second encrypted weight. Then, the cryptographic processing device obtains an encrypted secured distance that corresponds to an encryption of a secured distance between the first vector and the second vector from the first encrypted polynomial, the second encrypted polynomial, the first encrypted weight, and the second encrypted weight.

Patent Document 1: Japanese Laid-open Patent Publication No. 2014-126865

Non Patent Document 1: C. Gentry, "Fully Homomorphic Encryption Using Ideal Lattices", STOC 2009, pp. 169-178, 2009.

Non Patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.

SUMMARY

According to an aspect of the invention, a cryptographic processing device includes a processor, a transmitter, and a receiver.

The processor generates a first encrypted polynomial by encrypting a first polynomial that corresponds to a first vector obtained by adding a first random number to a zero vector as a component.

The transmitter transmits, to a terminal, first cryptographic information that represents the first encrypted polynomial.

The receiver receives, from a calculation device, second cryptographic information that represents a fourth encrypted polynomial, and receives, from the calculation device, third cryptographic information that represents a second random number, the fourth encrypted polynomial including a first operation result that is a result of an operation of a fifth vector and a sixth vector that is obtained by adding, to a second vector, a result of a multiplication of the first random number by the second random number as a component, the first operation result being obtained by calculating from a second encrypted polynomial and a third encrypted polynomial, wherein the second encrypted polynomial is obtained by adding a result of a multiplication of the first encrypted polynomial by the second random number to a second polynomial that corresponds to a third vector obtained by adding zero to the second vector as a component, and the third encrypted polynomial is obtained by encrypting a third polynomial that corresponds to the fifth vector obtained by adding zero to a fourth vector as a component.

The processor decrypts the second cryptographic information and the third cryptographic information.

On the basis of a result of decrypting the second cryptographic information and a result of decrypting the third cryptographic information, the processor generates a second operation result that is a result of an operation of the second vector and the fourth vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will now be described in detail with reference to the drawings.

Section 3.2 of Non Patent Document 2 discloses a practical constructing method of a homomorphic encryption. According to this method, three key-generating parameters (n,q,t) are mainly used to generate an encryption key. n is an integer that is a power of two, and is referred to as a lattice dimension. q is a prime, and t is an integer that is less than the prime q.

In the process of the encryption key generation, first, a polynomial sk of degree n−1 in which each coefficient is very small is generated as a secret key at random. The value of each coefficient is restricted by a certain parameter σ. Next, a polynomial a1 of degree n−1 in which each coefficient is less than q and a polynomial e of degree n−1 in which each coefficient is very small are generated at random. Then, the following formula for a polynomial a0 is calculated, and a pair of polynomials (a0,a1) is defined as a public key pk.

$$a0 = -(a1*sk + t*e) \quad (11)$$

However, in a calculation of the polynomial a0, a polynomial whose degree is lower than n is always calculated by using "$x^n = -1$, $x^{n+1} = -x$, ..." with respect to a polynomial whose degree is higher than or equal to n. Further, as a coefficient in each term included in a polynomial, a remainder obtained by dividing the coefficient by a prime q is used. A space in which such a polynomial operation is performed is often technically represented as $R_q := F_q[x]/(x^n+1)$.

Next, for plaintext data m that is represented by a polynomial of degree n−1 in which each coefficient is less than t and a public key pk, three polynomials u, f, and g of degree n−1 in which each coefficient is very small are generated at random, and cryptographic data Enc(m,pk) of the plaintext data m is defined by the following formulas:

$$Enc(m,pk) = (c0,c1) \quad (12)$$

$$c0 = a0*u + t*g + m \quad (13)$$

$$c1 = a1*u + t*f \quad (14)$$

The polynomial operation in the space $R_q$ is also used for a calculation of the polynomial c0 and the polynomial c1. In this case, a cryptographic addition for cryptographic data Enc(m1,pk)=(c0,c1) and cryptographic data Enc(m2,pk)=(d0,d1) is performed by the following formula:

$$Enc(m1,pk) + Enc(m2,pk) = (c0+d0, c1+d1) \quad (15)$$

Further, a cryptographic multiplication for the cryptographic data Enc(m1,pk) and the cryptographic data Enc(m2,pk) is performed by the following formula:

$$Enc(m1,pk)*Enc(m2,pk) = (c0*d0, c0*d1+c1*d0, c1*d1) \quad (16)$$

When performing the cryptographic multiplication by Formula (16), the cryptographic data changes from that of a two-dimensional vector to that of three-dimensional vector. If the cryptographic multiplication is repeated several times, there is a further increase in the elements of the cryptographic data that is a multiplication result.

Next, decryption processing is described. The cryptographic data c=(c0,c1,c2, ...) in which the elements have increased as a result of an operation such as a several-times cryptographic multiplication is decrypted by calculating the following formula for a decryption result Dec(c,sk) by use of a secret key sk.

$$Dec(c,sk) = [c0 + c1*sk + c2*sk^2 + \ldots]_q \bmod t \quad (17)$$

In Formula (17), $[f(x)]_q \bmod t$ represents a polynomial in which each coefficient $z_i$ in a polynomial f(x) is replaced with $[z_i]_q \bmod t$. A value of $[z]_q$ for an integer z is defined by the following formula by use of a remainder w obtained by dividing z by q:

$$[z]_q = w \quad \text{(in case of } w < q/2\text{)} \quad (18)$$

$$[z]_q = w - q \quad \text{(in case of } w \geq q/2\text{)} \quad (19)$$

Thus, the range of values of $[z]_q$ is $[-q/2, q/2)$. Further, a mod t represents a remainder obtained by dividing an integer a by t.

Taking (n,q,t)=(4,1033,20) for example, the following polynomial is a simple example of a secret key sk, a public key pk, and cryptographic data Enc(m,pk):

$$sk = \text{Mod}(\text{Mod}(4,1033)*x^3 + \text{Mod}(4,1033)*x^2 + \text{Mod}(1,1033)*x, x^4+1) \quad (20)$$

$$pk = (a0, a1) \quad (21)$$

$$a0 = \text{Mod}(\text{Mod}(885, 1033)*x^3 + \text{Mod}(519, 1033)*x^2 + \text{Mod}(621, 1033)*x + \text{Mod}(327, 1033), x^4+1) \quad (22)$$

$$a1 = \text{Mod}(\text{Mod}(661, 1033)*x^3 + \text{Mod}(625, 1033)*x^2 + \text{Mod}(861, 1033)*x + \text{Mod}(311, 1033), x^4+1) \quad (23)$$

$$Enc(m,pk) = (c0,c1) \quad (24)$$

$$m = 3 + 2x + 2x^2 + 2x^3 \quad (25)$$

$$c0 = \text{Mod}(\text{Mod}(822, 1033)*x^3 + \text{Mod}(1016, 1033)*x^2 + \text{Mod}(292, 1033)*x + \text{Mod}(243, 1033), x^4+1) \quad (26)$$

$$c1 = \text{Mod}(\text{Mod}(840, 1033)*x^3 + \text{Mod}(275, 1033)*x^2 + \text{Mod}(628, 1033)*x + \text{Mod}(911, 1033), x^4+1) \quad (27)$$

In Formulas (20) to (27), Mod(a,q) represents a remainder obtained by dividing an integer a by a prime q, and Mod(f (x), $x^4+1$) represents a remainder (polynomial) obtained by dividing a polynomial f(x) by a polynomial $x^4+1$. For example, Mod(f(x),$x^4+1$) for f(x)=$x^4$ is equal to Mod(f(x), $x^4+1$) for f(x)=−1, and Mod(f(x),$x^4+1$) for f(x)=$x^5$ is equal to Mod(f(x),$x^4+1$) for f(x)=−x.

The two pieces of cryptographic data, Enc(f(x),pk) and Enc(g(x),pk), for the two polynomials of a degree not higher than n−1, f(x) and g(x), have characteristics with respect to addition and multiplication as described in the following formulas:

$$Enc(f(x),pk)+Enc(g(x),pk)=Enc(f(x)+g(x),pk) \quad (31)$$

$$Enc(f(x),pk)*Enc(g(x),pk)=Enc(f(x)*g(x),pk) \quad (32)$$

Further, a cryptographic processing device of Patent Document 1 permits a great improvement in processing time and a size of cryptographic data by performing a polynomial transformation to represent the vector data as one polynomial and encrypting the polynomial by a homomorphic encryption.

In this cryptographic processing device, for example, the following two d-dimensional vectors are used as input data:

$$A=(a_0,a_1,\ldots,a_{n-1}) \quad (41)$$

$$B=(b_0,b_1,\ldots,b_{n-1}) \quad (42)$$

The following two types of polynomial transformation, for example, an ascending-order transformation and a descending-order transformation, are used to calculate an inner product or a distance of two vectors at a high speed in a state in which those two vectors remain encrypted.

[Ascending-Order Transformation]

$$A = (a_0, a_1, a_2, \ldots, a_{n-1}) \quad (43)$$
$$\Rightarrow pm1(A) = \sum_{i=0}^{n-1} a_i x^i$$

[Descending-Order Transformation]

$$B = (b_0, b_1, b_2, \ldots, b_{n-1}) \quad (44)$$
$$\Rightarrow pm2(B) = -\sum_{i=0}^{n-1} b_i x^{n-i}$$

When encrypting the polynomial pm1(A) and the polynomial pm2(B) by a homomorphic encryption, an encrypted polynomial E(pm1(A)) and an encrypted polynomial E(pm2(B)) are generated.

$$E(pm1(A))=Enc(pm1(A),pk) \quad (45)$$

$$E(pm2(B))=Enc(pm2(B),pk) \quad (46)$$

When multiplying the encrypted polynomial E(pm1(A)) by the encrypted polynomial E(pm2(B)), a multiplication pm1(A)*pm2(B) is performed in a state in which the polynomials remain encrypted. Then, when decrypting a multiplication result E(pm1(A))*E(pm2(B)), a constant term included in a polynomial that is a decryption result is a value such as the following formula:

$$\sum_{i=0}^{n-1} a_i b_i = a_0 b_0 = a_1 b_1 + \ldots + a_{n-1} b_{n-1} \quad (47)$$

Formula (47) represents an inner product of a vector A and a vector B. According to this method, it is possible to calculate the inner product more efficiently than by using the method for encrypting respective elements of the vector A and the vector B and multiplying them. Further, it is also possible to calculate, for example, a Hamming distance or an L2 norm at a high speed in a state in which they remain encrypted, using this inner calculation.

Figure 1:
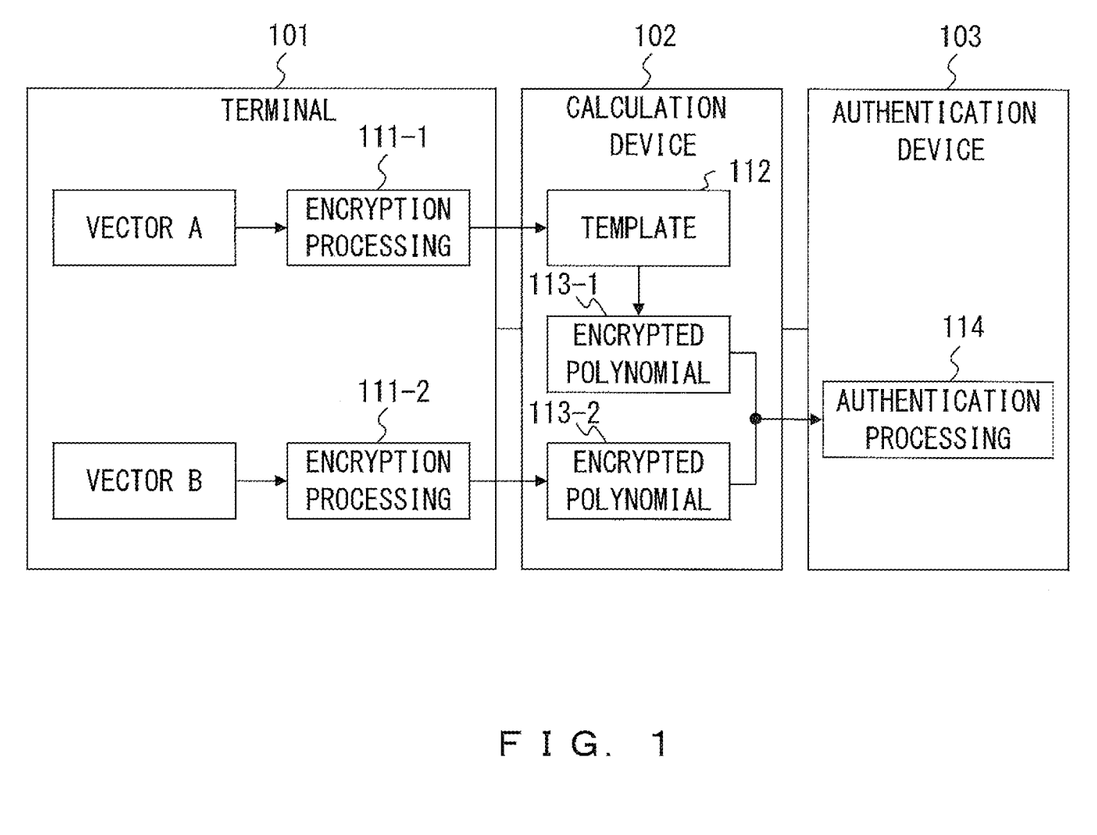
FIG. 1 is a block diagram of a biometric system using encrypted polynomials.

FIG. 1 is a block diagram of an example of a biometric system for which the cryptographic processing device disclosed in Patent Document 1 is used. The biometric system in FIG. 1 is a personal authentication system that uses biometric information, and includes a terminal 101, a calculation device 102, and an authentication device 103. The calculation device 102 is connected to the terminal 101 and the authentication device 103 via a communication network. The terminal 101 is, for example, a device of a user such as a client terminal, and the calculation device 102 and the authentication device 103 are, for example, a server. The terminal 101 has a public key of a homomorphic encryption and the authentication device 103 has a secret key of a homomorphic encryption.

While the biometric system is a personal authentication system that can easily be used because a user does not have to remember complicated information such as a password, it is desirable to provide strong protections against, for example, leaks of biometric information because the biometric information is permanent confidential information for the user. Thus, in the biometric system in FIG. 1, biometric information of a user is protected using a homomorphic encryption.

When registering biometric information, the terminal 101 obtains biometric information on a user who is a registrant using a sensor, transforms the feature information extracted from the biometric information into a vector A as described in Formula (41), and performs encryption processing 111-1. As biometric information obtained by a sensor, image information such as a fingerprint, a face, a vein, and an iris, or phonetic information such as a voice can be used.

In the encryption processing 111-1, the terminal 101 transforms the vector A into a polynomial pm1(A) as described in Formula (43), and encrypts the polynomial pm1(A) using a homomorphic encryption so as to generate an encrypted polynomial E(pm1(A)). Then, the terminal 101 transmits cryptographic information that represents the encrypted polynomial E(pm1(A)) to the calculation device 102. The calculation device 102 registers the cryptographic information received from the terminal 101 in a database as a template 112 that represents registered biometric information.

When authenticating biometric information, the terminal 101 obtains biometric information on a user who is a target to be authenticated, transforms feature information extracted from the biometric information into a vector B as described in Formula (42), and performs encryption processing 111-2.

In the encryption processing 111-2, the terminal 101 transforms the vector B into a polynomial pm2(B) as described in Formula (44), and encrypts the polynomial pm2(B) using a homomorphic encryption so as to generate an encrypted polynomial E(pm2(B)). Then, the terminal 101 transmits cryptographic information that represents the encrypted polynomial E(pm2(B)) to the calculation device 102.

The calculation device 102 performs a cryptographic operation by use of the encrypted polynomial E(pm1(A)) represented by the template 112 and the encrypted polynomial E(pm2(B)) represented by the cryptographic information received from the terminal 101, and transmits cryptographic information that represents a result of the cryptographic operation to the authentication device 103.

The authentication device 103 performs authentication processing 114 on the basis of the cryptographic information received from the cryptographic processing device 101. In the authentication processing 114, the authentication device 103 generates a result of an operation of the vector A and the vector B by decrypting the received cryptographic information, and performs authentication on the basis of the generated result of the operation.

For example, a distance between the vector A and the vector B (such as a Hamming distance) is used as the result of the operation of the vector A and the vector B. In this case, the calculation device 102 can calculate the distance between the vector A and the vector B in a state in which the two vectors remain encrypted, and the authentication device 103 can determine whether authentication has been successful by comparing the distance to a threshold. It is determined that the authentication of the target to be authenticated has been successful when the distance is less than the threshold, and it is determined that the authentication has been unsuccessful when the distance is not less than the threshold.

According to such a biometric system, the terminal 101 only transmits encrypted information to the calculation device 102, and the calculation device 102 does not have a secret key, so the calculation device 102 never knows the vectors that represent biometric information of a user. Further, the calculation device 102 only transmits a result of a cryptographic operation to the authentication device 103, and the authentication device 103 only generates a result of an operation of a vector A and a vector B by description, so the authentication device 103, too, never knows the vectors that represent the biometric information of the user.

Thus, unless the calculation device 102 and the authentication device 103 collude with each other, neither the vector A nor the vector B is generated, and a personal authentication service is provided in a state in which the biometric information of the user remains protected.

However, in the biometric system in FIG. 1, it is possible for a malicious user to spoof a normal user by performing a replay attack. The replay attack is one of the typical spoofing attacks in an authentication system; in concrete terms, an attacker illegally obtains cryptographic information on an encrypted polynomial that is to be transmitted by a normal user by eavesdropping on the communication path between the terminal 101 and the calculation device 102. The attacker retransmits the obtained cryptographic information to the cryptographic processing device 102 spoofing the normal user, which permits a successful authentication to be performed by the authentication device 103.

The above-mentioned problem may occur not only in a personal authentication system based on an encrypted secured distance but also in the other authentication systems based on a cryptographic operation by use of encrypted polynomials.

The challenge-response authentication scheme is effective against such a replay attack. In this authentication scheme, a device which performs authentication generates a random number that is called a "challenge", and transmits it to a terminal. The terminal generates data that is called a "response" on the basis of the received challenge and information to be authenticated, and replies to the device which performs authentication. Then, the device which performs authentication performs authentication processing by use of the challenge and the received response. According to the challenge-response authentication scheme, authentication will not be successfully performed even if a response is obtained by eavesdropping and is retransmitted because the response changes every time the challenge is generated.

Thus, an introduction of a mechanism that uses a challenge-response authentication is considered as protection against replay attacks in the biometric system in FIG. 1.

The characteristics of a cryptographic operation using a homomorphic encryption will be described before a biometric system according to embodiments is described.

As described in Formulas (31) and (32), in a cryptographic operation using a homomorphic encryption, addition and multiplication for two polynomials f(x) and g(x) have the characteristics described in the following formulas:

$$E(f(x))+E(g(x))=E(f(x)+g(x)) \quad (51)$$

$$E(f(x))*E(g(x))=E(f(x)*g(x)) \quad (52)$$

Further, when using the practical constructing method disclosed in Non Patent Document 2, the characteristics of these addition and multiplication can be rewritten into the following formulas:

$$f(x)+E(g(x))=E(f(x)+g(x)) \quad (53)$$

$$f(x)*E(g(x))=E(f(x)*g(x)) \quad (54)$$

Formula (53) or Formula (54) indicate that even if an f(x) that has not been encrypted is added to or multiplied by E(g(x)), it is possible to obtain a decryption result that is identical with E(f(x)+g(x)) or E(f(x)*g(x)) when decrypting an operation result obtained by the addition or the multiplication. Such a cryptographic operation makes processing more efficient because the processing of encrypting f(x) can be omitted. Therefore, the characteristics of Formula (53) and Formula (54) may be used in the following cryptographic operation.

Figure 2:
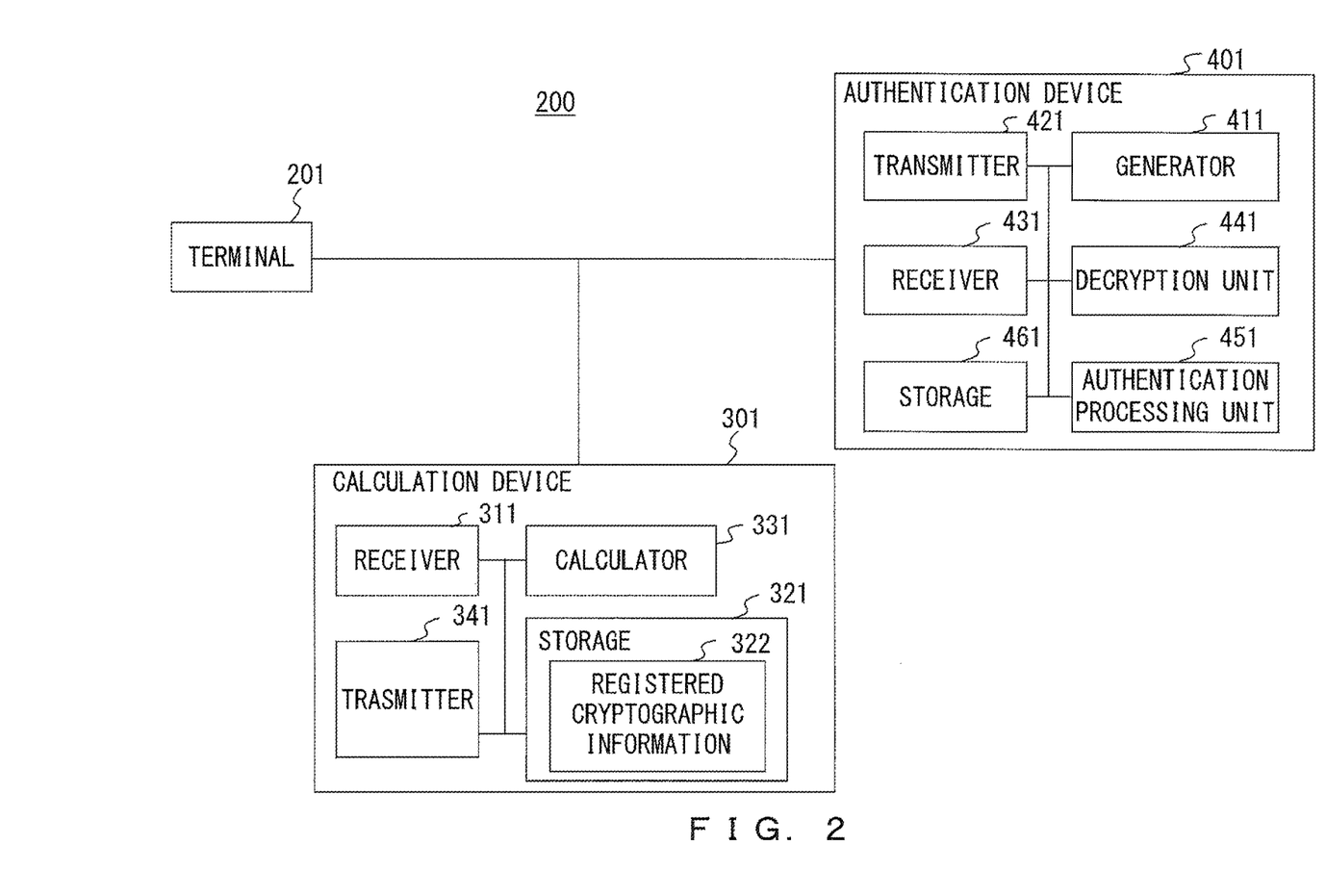
FIG. 2 is a block diagram of a biometric system according to an embodiment.

FIG. 2 is a block diagram of a biometric system according to an embodiment.

A biometric system 200 includes a terminal 201, a calculation device 301, and an authentication device 401. The terminal 201, the calculation device 301, and the authentication device 401 are connected to one another via a communication network, and can communicate with one another.

The terminal 201 is, for example, a device of a user such as a client terminal, and the calculation device 301 and the authentication device 401 are, for example, a server. The terminal 201 and the authentication device 401 have a public key of a homomorphic encryption and the authentication device 401 has a secret key of a homomorphic encryption that corresponds to the public key. Further, the terminal 201 and the authentication device 401 have a key-generating parameter t used when the public key is generated. The authentication device 401 is an example of a cryptographic processing device.

When registering biometric information, the terminal 201 obtains biometric information on a registrant using a sensor, and transforms the feature information extracted from the biometric information into a vector A as described in Formula (41). Next, the terminal 201 generates a vector A' obtained by adding zero to the vector A as a last component (element). The vector A' may be represented as a vector (A||0). The vector A' is obtained by use of Formula (61) below:

$$A' = (A||0) = (a_0, a_1, \ldots, a_{n-1}, 0) \quad (61)$$
$$= (a_0, a_1, \ldots, a_{n-1}, a_n), \text{ wherein } a_n = 0$$

The terminal 201 transforms the vector A' into a polynomial pm1(A') as described in Formula (63) below, and encrypts the polynomial pm1(A') using a homomorphic encryption so as to generate an encrypted polynomial E(pm1 (A')). Then, the terminal 201 transmits cryptographic information that represents the encrypted polynomial E(pm1(A')) to the calculation device 301.

$$A' = (a_0, a_1, a_2, \ldots, a_{n-1}, a_n), \text{ wherein } a_n = 0 \quad (63)$$
$$\Rightarrow pm1(A') = \sum_{i=0}^{n} a_i x^i$$

terminal 201 receives a challenge from the authentication device 401 and generates a random number r. The terminal 201 generates a response using the random number r and the challenge, and transmits the response to the calculation device 301.

The calculation device 301 includes a receiver 311, a storage 321, a calculator 331, and a transmitter 341.

The receiver 311 receives cryptographic information from the terminal 201. Further, the receiver 311 receives a response from the terminal 201.

The storage 321 is a storage device that stores a program or data used in the calculation device 301. The storage 321 stores therein an encrypted polynomial. Specifically, the storage 321 stores therein, as registered cryptographic information 322, the cryptographic information received from the terminal 201, the cryptographic information representing the encrypted polynomial E(pm1(A')). As cryptographic information that represents an encrypted polynomial, for example, a coefficient included in each term of the encrypted polynomial can be used. Further, the storage 321 stores therein the public key and the key-generating parameter t.

The calculator 331 performs a cryptographic operation using the response and the registered cryptographic information that have been received from the terminal 201.

The transmitter 341 transmits, to the authentication device 401, cryptographic information that represents a result of the cryptographic operation performed by the calculator 331 and cryptographic information that represents the random number r.

The authentication device 401 includes a generator 411, a transmitter 421, a receiver 431, a decryption unit 441, an authentication processing unit 451, and a storage 461.

The generator 411 generates a random number p and generates a challenge using the random number p.

The transmitter 421 transmits the generated challenge to the terminal 201.

The receiver 431 receives the cryptographic information received from the calculation device 301.

The decryption unit 441 decrypts the received cryptographic information.

The authentication processing unit 451 performs authentication processing on the basis of a decryption result.

The storage 461 is a storage device that stores a program or data used in the authentication device 401. The storage 461 stores therein the generated random number p, the public key, the secrete key, and the key-generating parameter t.

Figure 3:
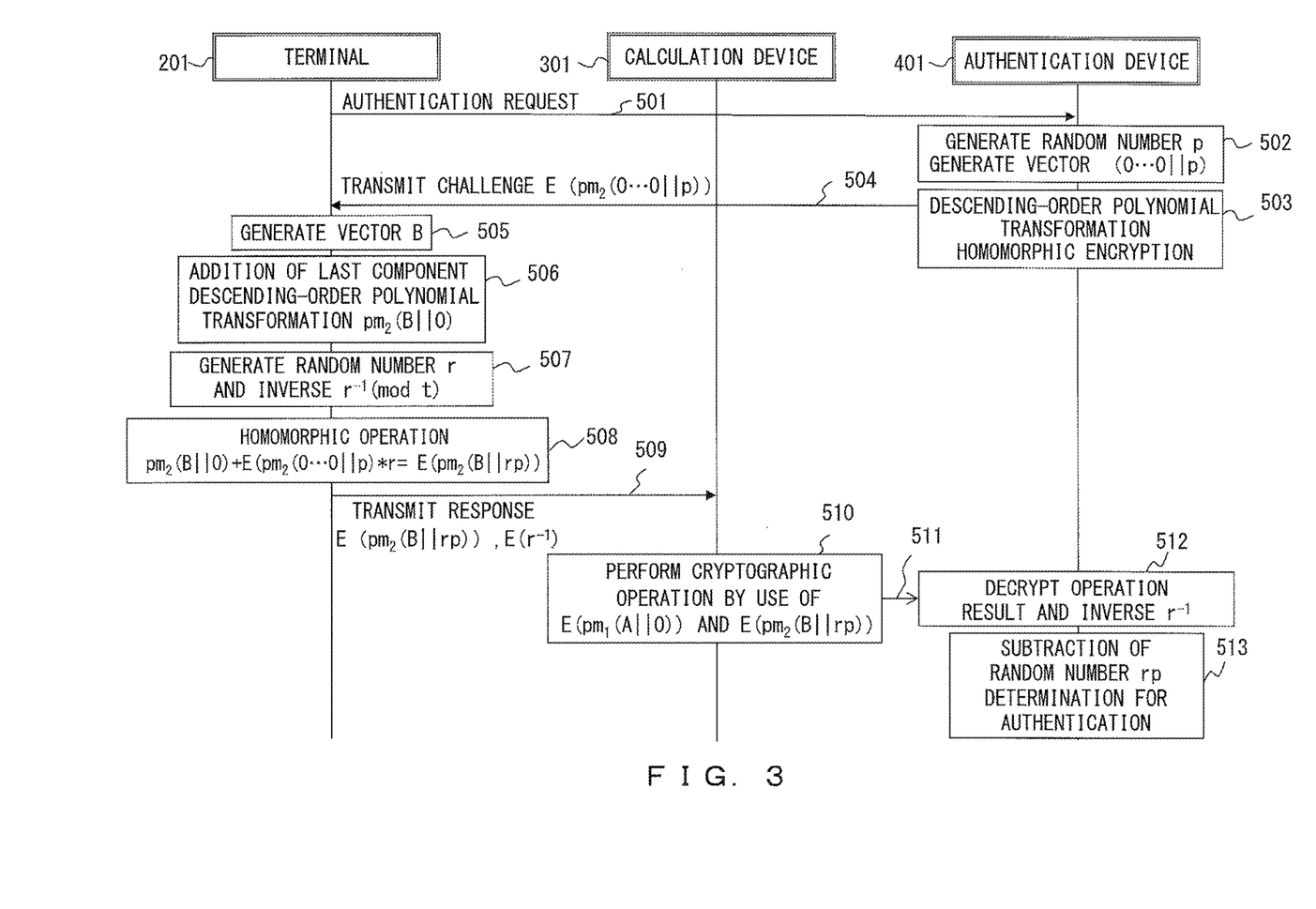
FIG. 3 is a flowchart of a cryptographic process according to the embodiment.

FIG. 3 is a flowchart of a cryptographic process according to the embodiment.

In Step 501, the terminal 201 transmits an authentication request to the authentication device 401.

In Step 502, the receiver 431 receives the authentication request. Then, the generator 411 generates a random number p. The random number p is an integer not less than zero, and is less than a key-generating parameter t. The generator 411 generates a vector P' obtained by adding a random number r to a zero vector as a component. Specifically, the generator 411 determines the random number p as a last component, and generates the vector P' in which n components except for the last component are zero. The vector P' may be represented as a vector $(0 \ldots 0 \| p)$. The vector P' is obtained by use of Formula (71) below:

$$P' = (0 \ldots 0 \| p) = (0, 0, \ldots, 0, p) \quad (71)$$
$$= (p_0, p_1, \ldots, p_{n-1}, p_n), \text{ wherein } p_0 \text{ to } p_{n-1} = 0, p_n = p$$

In Step 503, the generator 411 transforms the vector P' into a polynomial pm2(P') as described in Formula (72) using a descending-order polynomial transformation.

$$P' = (p_0, p_1, p_2, \ldots, p_{n-1}, p_n), \text{ wherein } p_0 \text{ to } p_{n-1} = 0, p_n = p \quad (72)$$
$$\Rightarrow pm2(P') = -\sum_{i=0}^{n} p_i x^{n+1-i}$$

The generator 411 generates challenge cryptographic data chl=E(pm2(P')) by encrypting the polynomial pm2(P') using a homomorphic encryption.

In Step 504, the transmitter 421 transmits cryptographic information that represents the challenge cryptographic data chl to the terminal 201 as a challenge.

In Step 505, the terminal 201 receives the challenge cryptographic data chl from the authentication device 401. Specifically, the terminal 201 receives cryptographic information that represents the challenge cryptographic data chl. The terminal 201 obtains biometric information on a target to be authenticated using a sensor and transforms the feature information extracted from the biometric information into a vector B as described in Formula (42). In the present embodiment, the vector A and the vector B are binary vectors. In other words, each of the elements $a_0$ to $a_{n-1}$ of the vector A is 0 or 1, and each of the elements $b_0$ to $b_{n-1}$ of the vector B is 0 or 1.

In Step 506, the terminal 201 generates a vector B' obtained by adding zero to the vector B as a last component (element). The vector B' may be represented as a vector $(B \| 0)$. The vector B' is obtained by use of Formula (73) below:

$$B' = (B \| 0) = (b_0, b_1, \ldots, b_{n-1}, 0) \quad (73)$$
$$= (b_0, b_1, \ldots, b_{n-1}, b_n), \text{ wherein } b_n = 0$$

The terminal 201 transforms the vector B' into a polynomial pm2(B') as described in Formula (74) below using a descending-order polynomial transformation.

$$B' = (b_0, b_1, b_2, \ldots, b_{n-1}, b_n), \text{ wherein } b_n = 0 \quad (74)$$
$$\Rightarrow pm2(B') = -\sum_{i=0}^{n} b_i x^{n+1-i}$$

In Step 507, the terminal 201 generates a random number r. Then, the terminal 201 calculates an inverse $r^{-1}$ of the random number r, in which t is a divisor. The random number r is an integer not less than zero, and is less than the key-generating parameter t.

In Step 508, the terminal 201 multiplies the challenge cryptographic data chl by the random number r, and adds the polynomial pm2(B') to a multiplication result, so as to calculate response cryptographic data res. The response cryptographic data res that is an encrypted polynomial is obtained by use of Formula (75) below, using the characteristics of Formulas (53) and (54):

$$\begin{aligned} \text{res} &= pm2(B') + chl^*r \\ &= pm2(B\|0) + E(pm2(0 \ldots 0\|p))^*r \\ &= pm2(B\|0) + E(pm2(0 \ldots 0\|rp)) \\ &= E(pm2(B\|rp)) \end{aligned} \quad (75)$$

Here, the vector $(B\|rp) = (b_0, b_1, \ldots, b_{n-1}, rp)$.

Further, the terminal 201 generates an encrypted inverse $E(r^{-1})$ by encrypting the inverse $r^{-1}$ using a homomorphic encryption.

In Step 509, the terminal 201 transmits, to the calculation device 301, as a response, pieces of cryptographic information that respectively represent the response cryptographic data res and the encrypted inverse $E(r^{-1})$. It is difficult to calculate an encrypted random number $E(r)$ from an encrypted inverse $E(r^{-1})$, so even when an attacker eavesdrops on challenge cryptographic data chl and response cryptographic data res, it is possible to prevent an encrypted polynomial $E(pm2(B\|0))$ from being calculated from these pieces of information, which results in enhancing security.

In Step 510, the receiver 311 receives the response from the terminal 201. The calculator 331 performs a cryptographic operation by use of the registered cryptographic information 322 (that is, the encrypted polynomial $E(pm1(A'))$) and the response cryptographic data res (that is, the encrypted polynomial $E(pm2(B\|rp))$) that are stored in the storage 321, so as to generate a result of the cryptographic operation.

Specifically, as a result of the cryptographic operation of $E(pm1(A'))$ and $E(pm2(B\|rp))$, the calculator calculates an encrypted Hamming distance $E(D_H)$ between the vector A' and the vector $(B\|rp)$ using Formula (76) below:

$$E(D_H) = E(pm1(A'))^*C1 + E(pm2(B\|rp))^*C2 - 2^*E(pm1(A'))^*E(pm2(B\|rp)) \quad (76)$$

In this case, a polynomial C1 and a polynomial C2 are obtained using the following formulas:

$$C1 = 2 - C2 \quad (77)$$

$$C2 = \Sigma_{i=0}^n x^i \quad (78)$$

In Step 511, the transmitter 341 transmits, to the authentication device 401, pieces of cryptographic information that respectively represent the encrypted Hamming distance $E(D_H)$ and the encrypted inverse $E(r^{-1})$. The cryptographic information that represents the encrypted inverse $E(r^{-1})$ is an example of cryptographic information that represents a random number r.

In Step 512, the receiver 431 receives the pieces of cryptographic information that respectively represent the encrypted Hamming distance $E(D_H)$ and the encrypted inverse $E(r^{-1})$.

The decryption unit 441 decrypts the encrypted Hamming distance $E(D_H)$ represented by the received cryptographic information, so as to generate a polynomial $D_H$ that is a decryption result. This polynomial $D_H$ is equivalent to a polynomial obtained by calculating Formula (79) below:

$$pm1(A')^*C1 + pm2(B\|rp)^*C2 - 2^*pm1(A')^*pm2(B\|rp) \quad (79)$$

Further, the decryption unit 441 calculates the inverse $r^{-1}$ by decrypting the encrypted inverse represented by the received cryptographic information.

In Step 513, the authentication processing unit 451 calculates the random number r from the inverse $r^{-1}$. The authentication processing unit 451 multiplies the random number r by the random number p so as to obtain a multiplication result rp. The authentication processing unit 451 calculates, from a constant term included in the polynomial $D_H$, a Hamming distance HD between the vector A' and the vector $(B\|rp)$ that is represented by Formula (80) below:

$$\begin{aligned} HD &= a_0 + a_1 + \ldots + a_{n-1} + a_n + b_0 + b_1 + \ldots + b_{n-1} + b_n - 2 \\ & \quad (a_0 b_0 + a_1 b_1 + \ldots + a_{n-1} b_{n-1} + a_n b_n), \text{ wherein } a_n = 0, \\ b_n &= rp \end{aligned} \quad (80)$$

The authentication processing unit 451 obtains an operation result by subtracting the multiplication result rp from the Hamming distance HD. The Hamming distance HD between the vector A' and the vector $(B\|rp)$ that is represented by Formula (80) above is equivalent to a value obtained by adding a Hamming distance $HD_{AB}$ between the vector A and the vector B to the multiplication result rp. Thus, if the multiplication result rp is subtracted from the Hamming distance HD, the Hamming distance $HD_{AB}$ between the vector A and the vector B is obtained as an operation result.

The authentication processing unit 451 performs the authentication of the target to be authenticated on the basis of the operation result (the Hamming distance $HD_{AB}$), and outputs an authentication result. Specifically, the authentication processing unit 451 determines whether authentication has been successful by comparing the operation result (the Hamming distance $HD_{AB}$) to a threshold. In this case, it is determined that the authentication of the target to be authenticated has been successful when the operation result (the Hamming distance $HD_{AB}$) is less than the threshold, and it is determined that the authentication has been unsuccessful when the operation result (the Hamming distance $HD_{AB}$) is not less than the threshold.

According to the biometric system of the present embodiment, authentication will not be successfully performed even if an attacker eavesdrops on response cryptographic data and retransmits it because the response cryptographic data changes every time the authentication device generates challenge cryptographic data. As a result, it is possible to prevent spoofing by a replay attack.

Further, according to the biometric system of the present embodiment, even if an attacker is allowed to see data in the calculation device (for example, if the attacker is an administrator of the calculation device), it is still possible to prevent spoofing by a replay attack because the response cryptographic data is generated by use of a random number generated by the terminal and a random number generated by the authentication device.

The configuration of the biometric system in FIG. 2 is merely an example and some of the components may be omitted or changed according to the applications or the requirements of the calculation device 301 and the authentication device 401. For example, in the biometric system in FIG. 2, a target to be authenticated may perform processing for authenticating biometric information using a different terminal than the terminal 201. A plurality of users may perform processing for registering and authenticating biometric information, and a plurality of terminals 201 may be provided for the plurality of users.

Further, the calculation device 301 and the authentication device 401 in FIG. 2 are also applicable to an authentication system other than a biometric system that uses a result of an operation of a vector A and a vector B. For example, it is possible to perform a personal authentication by transforming information other than biometric information, such as image information and phonetic information, into vectors.

The flowchart illustrated in FIG. 3 is merely an example, and some of the processes may be omitted or changed according to the applications or the requirements of the calculation device 301, the authentication device 401, or the biometric system. For example, in the cryptographic process in FIG. 3, when a device that is located outside the authentication device 401 generates a random number, the process of generating a random number p in Step 502 can be omitted. Likewise, when a device that is located outside the terminal 201 generates a random number, the process of generating a random number r in Step 507 can be omitted.

Formulas (1) to (80) are merely examples, and other formulations may be used. For example, instead of the ascending-order transformation in Formula (63) being used for the vector A', the descending-order transformation in Formula (72) being used for the vector P', and the descending-order transformation in Formula (74) being used for the vector B', the ascending-order transformation may be used for the vector P' and the vector B', and the descending-order transformation for the vector A'.

The vectors A', B', and P' described above are merely examples, and zeros in the vectors A' and B' and the random number p in the vector P' may be in any position if zeros added to the vectors A and B as a component and the random number p in the vector P' are in the same position. For example, a vector obtained by adding zero to the vector A as a first component may be the vector A', a vector in which the random number p is a first component and n components except for the first component are zero may be the vector P', and a vector obtained by adding zero to the vector B as a first component may be the vector B'.

In a cryptographic operation using a homomorphic encryption, addition and multiplication for two polynomials f(x) and g(x) may be performed on the basis of Formulas (51) and (52), instead of Formulas (53) and (54).

The terminal 201 may transmits cryptographic information that represents an encrypted random number E(r) instead of cryptographic information that represents an encrypted inverse $E(r^{-1})$. In this case, the transmitter 341 of the calculation device 301 transmits the cryptographic information that represents an encrypted random number E(r) instead of the cryptographic information that represents an encrypted inverse $E(r^{-1})$. The decryption unit 441 of the authentication device 401 calculates a random number r by decrypting the received cryptographic information, and the authentication processing unit 451 uses the random number r obtained by the decryption unit 441.

The formulation such that a Hamming distance HD appears in a coefficient in a term other than a constant term included in the polynomial $D_H$ in Formula (79) may be used.

The terminal 201, the calculation device 301, and the authentication device 401 in FIG. 2 can be implemented, for example, as a hardware circuit. In this case, each component in the calculation device 301 and the authentication device 401 may be implemented as an individual circuit, or a plurality of components may be implemented as an integrated circuit.

Figure 4:
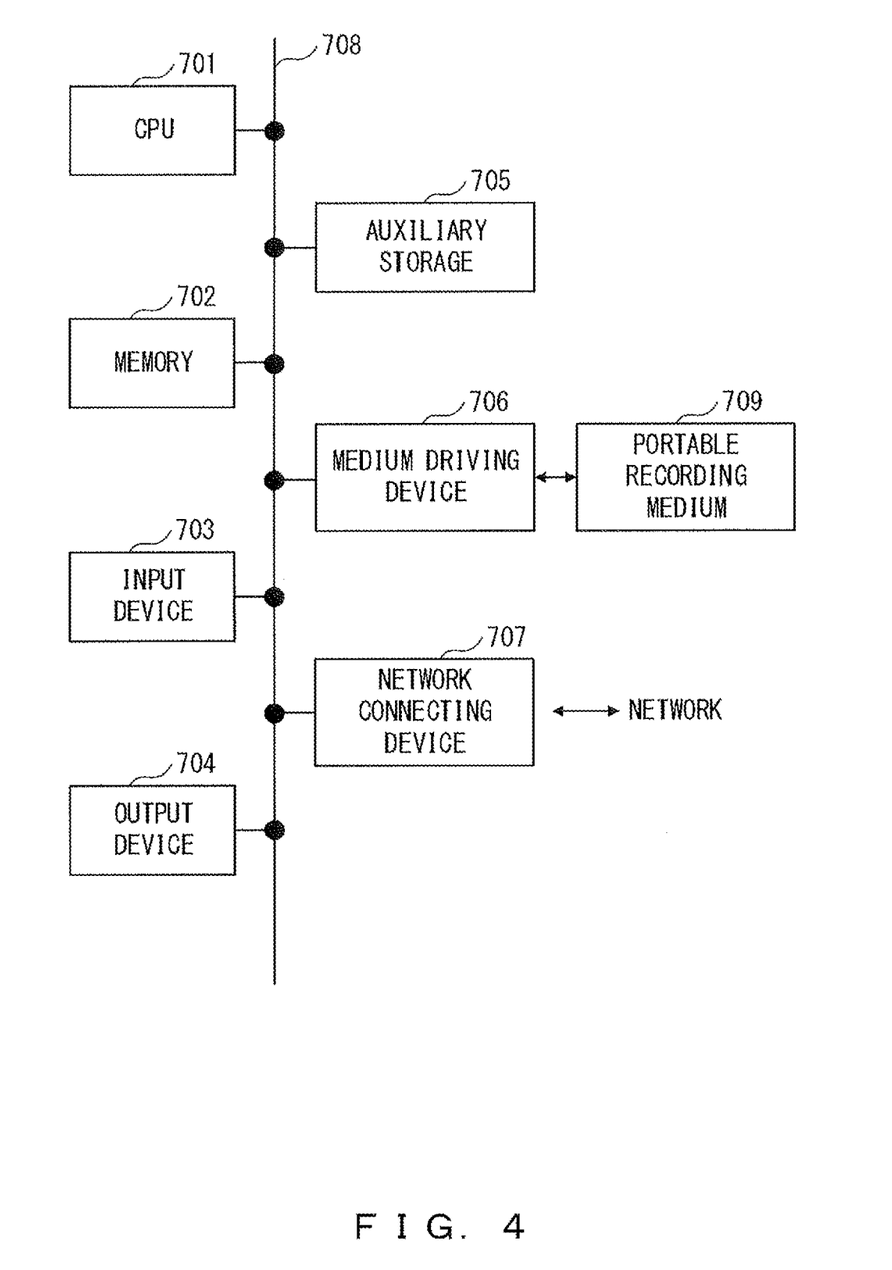
FIG. 4 is a block diagram of an information processing device (a computer).

FIG. 4 is a block diagram of an information processing device (a computer).

The terminal 201, the calculation device 301, and the authentication device 401 can also be realized by using an information processing device (a computer) as illustrated in FIG. 4.

The information processing device in FIG. 4 includes a central processing unit (CPU) 701, a memory 702, an input device 703, an output device 704, an auxiliary storage 705, a medium driving device 706, and a network connecting device 707. These components are connected to one another via a bus 708.

The memory 702 is, for example, a semiconductor memory such as a read only memory (ROM), a random access memory (RAM), and a flash memory. The memory 702 stores therein a program and data used for processing performed by the terminal 201, the calculation device 301, or the authentication device 401. The memory 702 can be used as the storage 321, 461.

When the information processing device is the terminal 201, the CPU 701 performs the processing of the terminal 201 by, for example, executing the program by use of the memory 702.

When the information processing device is the calculation device 301, the CPU 701 operates as the calculator 331 to perform a cryptographic process by, for example, executing the program by use of the memory 702.

When the information processing device is the authentication device 401, the CPU 701 operates as the generator 411, the decryption unit 441, and the authentication processing unit 451 to perform a cryptographic process by, for example, executing the program by use of the memory 702.

The input device 703 is, for example, a keyboard or a pointing device, and is used for inputting instructions or information from a user or an operator. The output device 704 is, for example, a display, a printer, or a speaker, and is used for outputting inquiries to the user or the operator, or outputting a result of processing. The result of processing may be a result of the authentication processing performed by the authentication device 401.

The auxiliary storage 705 is, for example, a magnetic disk device, an optical disk device, a magneto-optical disk device, or a tape device. The auxiliary storage 705 may be a hard disk drive or a flash memory. The information processing device stores the program and the data in the auxiliary storage 705 so as to load them into the memory 702 and use them. The auxiliary storage 705 can be used as the storage 321, 461.

The medium driving device 706 drives a portable recording medium 709 so as to access the recorded content. The portable recording medium 709 is, for example, a memory device, a flexible disk, an optical disc, or a magneto-optical disk. The portable recording medium 709 may be, for example, a compact disk read only memory (CD-ROM), a digital versatile disk (DVD), or a universal serial bus (USB) memory. The user or the operator can store the program and the data in the portable recording medium 709 so as to load them into the memory 702 and use them.

As described above, a computer-readable recording medium that stores therein a program and data is a physical (non-transitory) recording medium such as the memory 702, the auxiliary storage 705, and the portable storage medium 709.

The network connecting device 707 is a communication interface that is connected to a communication network such as a local area network (LAN) or the Internet and makes a data conversion associated with communication. The information processing device can receive the program and the data from an external device via the network connecting device 707 so as to load them into the memory 702 and use them. The network connecting device 707 can be used as the receiver 311, 431, or the transmitter 341, 421.

The information processing device does not necessarily include all the components in FIG. 4, and some of the components can be omitted according to the applications or the requirements. For example, when the instructions or the information from the user or the operator are not to be input, the input device 703 may be omitted, and when the inquiries to the user or the operator or the result of processing is not to be output, the output device 704 may be omitted. When the information processing device does not access the portable recording medium 709, the medium driving device 706 may be omitted.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptographic processing with or in device comprising: a processor that generates a first encrypted polynomial by encrypting a first polynomial that corresponds to a first vector obtained by adding a first random number generated by the cryptographic processing device to a zero vector as a component; a transmitter that transmits, to a terminal, first cryptographic information that represents the first encrypted polynomial; and a receiver that receives, from a calculation device, second cryptographic information that represents a fourth encrypted polynomial, and receives, from the calculation device, third cryptographic information that represents a second random number generated by the terminal, the fourth encrypted polynomial including a first operation result that is a result of an operation of a fifth vector and a sixth vector that is obtained by adding, to a second vector, a result of a multiplication of the first random number by the second random number as a component, the first operation result being obtained by calculating from a second encrypted polynomial and a third encrypted polynomial, wherein the second encrypted polynomial is obtained by adding a result of a multiplication of the first encrypted polynomial by the second random number to a second polynomial that corresponds to a third vector obtained by adding zero to the second vector as a component, and the third encrypted polynomial is obtained by encrypting a third polynomial that corresponds to the fifth vector obtained by adding zero to a fourth vector as a component, wherein the processor decrypts the second cryptographic information and the third cryptographic information, and generates a second operation result that is a result of an operation of the second vector and the fourth vector, on the basis of a result of decrypting the second cryptographic information and a result of decrypting the third cryptographic information, wherein the processor uses the result of the decrypting the second cryptographic information and a result of decrypting the third cryptographic information to prevent replay attacks.

2. The cryptographic processing device according to claim 1, wherein
the first operation result represents a Hamming distance between the fifth vector and the sixth vector, and
the second operation result represents a Hamming distance between the second vector and the fourth vector.

3. The cryptographic processing device according to claim 1, wherein
the third cryptographic information represents an encrypted inverse obtained by encrypting an inverse of the second random number, and
the processor calculates the second random number from an inverse of the second random number, the inverse being a result of decrypting the third cryptographic information, and subtracts the result of the multiplication of the first random number by the second random number from the first operation result, so as to obtain the second operation result.

4. A cryptographic processing method comprising: generating, by a cryptographic processing device, a first encrypted polynomial by encrypting a first polynomial that corresponds to a first vector obtained by adding a first random number generated by the cryptographic processing device to a zero vector as a component; transmitting, by the cryptographic processing device, to a terminal, first cryptographic information that represents the first encrypted polynomial; receiving, by the cryptographic processing device, from a calculation device, second cryptographic information that represents a fourth encrypted polynomial, and receiving, by the cryptographic processing device, from the calculation device, third cryptographic information that represents a second random number generated by the terminal, the fourth encrypted polynomial including a first operation result that is a result of an operation of a fifth vector and a sixth vector that is obtained by adding, to a second vector, a result of a multiplication of the first random number by the second random number as a component, the first operation result being obtained by calculating from a second encrypted polynomial and a third encrypted polynomial, wherein the second encrypted polynomial is obtained by adding a result of a multiplication of the first encrypted polynomial by the second random number to a second polynomial that corresponds to a third vector obtained by adding zero to the second vector as a component, and the third encrypted polynomial is obtained by encrypting a third polynomial that corresponds to the fifth vector obtained by adding zero to a fourth vector as a component; decrypting, by the cryptographic processing device, the second cryptographic information and the third cryptographic information; and generating, by the cryptographic processing device, a second operation result that is a result of an operation of the second vector and the fourth vector, on the basis of a result of decrypting the second cryptographic information and a result of decrypting the third cryptographic information, wherein the processor uses the result of the decrypting the second cryptographic information and a result of decrypting the third cryptographic information to prevent replay attacks.

5. The cryptographic processing method according to claim 4, wherein
the first operation result represents a Hamming distance between the fifth vector and the sixth vector, and
the second operation result represents a Hamming distance between the second vector and the fourth vector.

6. The cryptographic processing method according to claim 4, wherein
the third cryptographic information represents an encrypted inverse obtained by encrypting an inverse of the second random number, and
the generating the second operation result calculates the second random number from an inverse of the second random number, the inverse being a result of decrypting the third cryptographic information, and subtracts the result of the multiplication of the first random number by the second random number from the first operation result, so as to obtain the second operation result.

7. A non-transitory computer-readable recording medium having stored therein a cryptographic processing program for causing a computer to execute a process, the process comprising: generating a first encrypted polynomial by encrypting a first polynomial that corresponds to a first vector obtained by adding a first random number generated by the computer to a zero vector as a component; transmitting, to a terminal, first cryptographic information that represents the first encrypted polynomial; receiving, from a calculation device, second cryptographic information that represents a fourth encrypted polynomial, and receiving, from the calculation device, third cryptographic information that represents a second random number generated by the terminal, the fourth encrypted polynomial including a first operation result that is a result of an operation of a fifth vector and a sixth vector that is obtained by adding, to a second vector, a result of a multiplication of the first random number by the second random number as a component, the first operation result being obtained by calculating from a second encrypted polynomial and a third encrypted polynomial, wherein the second encrypted polynomial is obtained by adding a result of a multiplication of the first encrypted polynomial by the second random number to a second polynomial that corresponds to a third vector obtained by adding zero to the second vector as a component, and the third encrypted polynomial is obtained by encrypting a third polynomial that corresponds to the fifth vector obtained by adding zero to a fourth vector as a component; decrypting the second cryptographic information and the third cryptographic information; and generating a second operation result that is a result of an operation of the second vector and the fourth vector, on the basis of a result of decrypting the second cryptographic information and a result of decrypting the third cryptographic information, wherein the processor uses the result of the decrypting the second cryptographic information and a result of decrypting the third cryptographic information to prevent replay attacks.

8. The non-transitory computer-readable recording medium according to claim 7, wherein
the first operation result represents a Hamming distance between the fifth vector and the sixth vector, and
the second operation result represents a Hamming distance between the second vector and the fourth vector.

9. The non-transitory computer-readable recording medium according to claim 7, wherein
the third cryptographic information represents an encrypted inverse obtained by encrypting an inverse of the second random number, and
the generating the second operation result calculates the second random number from an inverse of the second random number, the inverse being a result of decrypting the third cryptographic information, and subtracts the result of the multiplication of the first random number by the second random number from the first operation result, so as to obtain the second operation result.

* * * * *